US008626071B2

(12) United States Patent
Han et al.

(10) Patent No.: US 8,626,071 B2
(45) Date of Patent: Jan. 7, 2014

(54) METHOD AND APPARATUS FOR INTERFERENCE MITIGATION IN HETEROGENEOUS NETWORK USING BEAMFORMING

(75) Inventors: Shuangfeng Han, Suwon-si (KR); Chi-Woo Lim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/358,386

(22) Filed: Jan. 25, 2012

(65) Prior Publication Data

US 2012/0190378 A1    Jul. 26, 2012

(30) Foreign Application Priority Data

Jan. 25, 2011    (KR) .................. 10-2011-0007168

(51) Int. Cl.
*H04B 1/00*    (2006.01)
(52) U.S. Cl.
USPC ........ 455/63.1; 455/452.2; 455/501; 379/416

(58) Field of Classification Search
USPC .................. 455/452.2, 449, 422.1, 63.1, 501; 379/416
See application file for complete search history.

(56) References Cited

U.S. PATENT DOCUMENTS

| 2009/0286482 | A1* | 11/2009 | Gorokhov et al. | 455/63.1 |
| 2010/0099450 | A1* | 4/2010 | Lu et al. | 455/501 |
| 2010/0222062 | A1* | 9/2010 | Chou et al. | 455/449 |
| 2011/0151918 | A1* | 6/2011 | Seo et al. | 455/522 |

* cited by examiner

*Primary Examiner* — San Htun
*Assistant Examiner* — Nathan Taylor (57) ABSTRACT

A method and apparatus provide interference mitigation in a heterogeneous network using beamforming. In the method, a macro Mobile Station (MS) receives a broadcast message including a Precoding Matrix Index (PMI) set restricted in a macro cell, measures a Signal-to-Interference plus Noise Ratio (SINR) and a channel power from an adjacent femto Base Station (BS) and calculates a PMI, determines whether to request a dedicated frequency resource for a macro MS on the basis of the measured SINR, the channel power from the adjacent femto BS, and the calculated PMI, and requests the dedicated frequency resource for the macro MS from a macro BS.

20 Claims, 9 Drawing Sheets

METHOD AND APPARATUS FOR INTERFERENCE MITIGATION IN HETEROGENEOUS NETWORK USING BEAMFORMING

CROSS-REFERENCE TO RELATED APPLICATION AND CLAIM OF PRIORITY

The present application is related to and claims priority under 35 U.S.C. §119 to an application filed in the Korean Intellectual Property Office on Jan. 25, 2011 and assigned Serial No. 10-2011-0007168, the contents of which are herein incorporated by reference.

TECHNICAL FIELD OF THE INVENTION

The present disclosure relates generally to a heterogeneous network having a plurality of femto cells in a macro cell.

BACKGROUND OF THE INVENTION

Next-generation wireless communication is associated with a high data rate and a stable quality in order to provide data and multimedia service. However, this is difficult to satisfy because a signal quality degrades due to high transmission loss in buildings such as houses, offices, and apartments. In order to solve the problem in such indoor environments, more Base Stations (BSs) may be installed, or macro cells may be used in outdoor places and wireless LANs may be used in indoor places. However, this method causes a cost load to service providers and requires users to purchase dual-mode Mobile Stations (MSs). Recently, research has been conducted on a femto cell as the solution to this problem, the standardization of which is determined by the IEEE 802.16m and 3GPP2 international standardization organizations.

A femto cell is also called the next-generation femto BS. The femto cell is similar in size to a conventional wireless router, uses an allowed frequency band, has a 10-30 m service coverage with a low power of 10-100 mW, and is connected to the network of a service provider through a conventional Digital Subscriber Line (DSL) network or a cable broadband network. The femto cell may be simply installed by a user in an indoor place in a plug-and-play mode. The femto cell relieves the cost load of service providers for construction of an additional infrastructure to remove shadow regions, and enables users to use stable, high-quality communication services in indoor places at a low cost without changing MSs.

For efficient operation of the femto cell, technical problems should be solved in the interference between a macro cell and a femto cell, power control, resource allocation, physical layer synchronization, network synchronization, a handover, a frame structure, self configuration and optimization, and operation and maintenance. Among them, the most important problem is a system deterioration caused by the interference between a macro cell and a femto cell.

A transmission (Tx) power reduction and a frequency reuse may be used to solve the lack of frequency resources due to broadband data communication requirements, and a beamforming antenna with spatial directionality may be used to improve the frequency reuse factor. The beamforming concentrates energy emitted from an antenna in a specific direction. The purpose of beamforming is to transmit or receive signals in a desired direction.

What is therefore required is a method and apparatus for interference mitigation by beamforming in a heterogeneous network having a plurality of femto cells in a macro cell.

SUMMARY OF THE INVENTION

To address the above-discussed deficiencies of the prior art, it is a primary aspect of the present disclosure to solve at least the above-mentioned problems and/or disadvantages and to provide at least some, none, or all of the advantages described below. Accordingly, an aspect of the present disclosure is to provide a method and apparatus for interference mitigation in a heterogeneous network using beamforming.

Another aspect of the present disclosure is to provide a method and apparatus for beamforming in a heterogeneous network.

According to an aspect of the present disclosure, a method for operating a femto Mobile Station (MS) for interference mitigation in a heterogeneous network using beamforming includes receiving a broadcast message from a femto Base Station (BS). The method also includes measuring a Signal-to-Interference plus Noise Ratio (SINR) and a channel power from an adjacent macro BS. The method further includes feeding back a restricted Precoding Matrix Index (PMI) or a preferred PMI to the femto BS on the basis of the measured SINR and the channel power from the adjacent macro BS.

According to another aspect of the present disclosure, a method for operating a femto Base Station (BS) for interference mitigation in a heterogeneous network using beamforming includes transmitting a broadcast message. The method also includes receiving a restricted Precoding Matrix Index (PMI) or a preferred PMI from femto Mobile Stations (MSs). The method further includes providing the PMI information to a macro BS on the basis of the PMI information received from the femto MSs.

According to another aspect of the present disclosure, a method for operating a macro Base Station (BS) for interference mitigation in a heterogeneous network using beamforming includes receiving Precoding Matrix Index (PMI) information from femto BSs. The method also includes constructing a restricted PMI set in a macro cell on the basis of the PMI information received from the femto BS. The method further includes transmitting a broadcast message including the PMI set.

According to another aspect of the present disclosure, a method for operating a macro Mobile Station (MS) for interference mitigation in a heterogeneous network using beamforming includes receiving a broadcast message including a Precoding Matrix Index (PMI) set restricted in a macro cell. The method also includes measuring a Signal-to-Interference plus Noise Ratio (SINR) and a channel power from an adjacent femto Base Station (BS) and calculating a PMI. The method further includes determining whether to request a dedicated frequency resource for a macro MS on the basis of the measured SINR, the channel power from the adjacent femto BS, and the calculated PMI. The method still further includes requesting the dedicated frequency resource for the macro MS from a macro BS.

According to another aspect of the present disclosure, an apparatus of a femto Mobile Station (MS) for interference mitigation in a heterogeneous network using beamforming includes a Radio Frequency (RF) module configured to receive a broadcast message from a femto Base Station (BS). The apparatus also includes a processor configured to measure a Signal-to-Interference plus Noise Ratio (SINR) and a channel power from an adjacent macro BS. The apparatus further includes a controller configured to feed back a restricted Precoding Matrix Index (PMI) or a preferred PMI to the femto BS on the basis of the measured SINR and the channel power from the adjacent macro BS.

According to another aspect of the present disclosure, an apparatus of a femto Base Station (BS) for interference mitigation in a heterogeneous network using beamforming includes a Radio Frequency (RF) module configured to transmit a broadcast message, and receive a restricted Precoding Matrix Index (PMI) or a preferred PMI from femto Mobile Stations (MSs). The apparatus also includes a controller configured to provide the PMI information to a macro BS on the basis of the PMI information received from the femto MSs.

According to another aspect of the present disclosure, an apparatus of a macro Base Station (BS) for interference mitigation in a heterogeneous network using beamforming includes a Radio Frequency (RF) module configured to receive Precoding Matrix Index (PMI) information from femto BSs. The apparatus also includes a controller configured to construct a restricted PMI set in a macro cell on the basis of the PMI information received from the femto BS. The apparatus further includes a processor configured to transmit a broadcast message including the PMI set.

According to another aspect of the present disclosure, an apparatus of a macro Mobile Station (MS) for interference mitigation in a heterogeneous network using beamforming includes a Radio Frequency (RF) module configured to receive a broadcast message including, a Precoding Matrix Index (PMI) set restricted in a macro cell. The apparatus also includes a controller configured to measure a Signal-to-Interference plus Noise Ratio (SINR) and a channel power from an adjacent femto Base Station (BS) and calculate a PMI, determine whether to request a dedicated frequency resource for a macro MS on the basis of the measured SINR, the channel power from the adjacent femto BS, and the calculated PMI, and request the dedicated frequency resource for the macro MS from a macro BS.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning, and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The present disclosure provides a method and apparatus for interference mitigation in a heterogeneous network using beamforming. The heterogeneous network is a network in which macro cells with different-sized cell coverages, at least one femto cell, a pico cell, and a relay are operated in an overlay manner.

In the following description, the term 'enhanced Node B' (eNB) is another term for macro Base Station (BS) used below. The term 'Home enhanced Node B' (HeNB) is another term for femto BS, pico BS or micro BS used below. The term 'User Equipment' (UE) is another term for Mobile Station (MS) used below.

Figure 1:
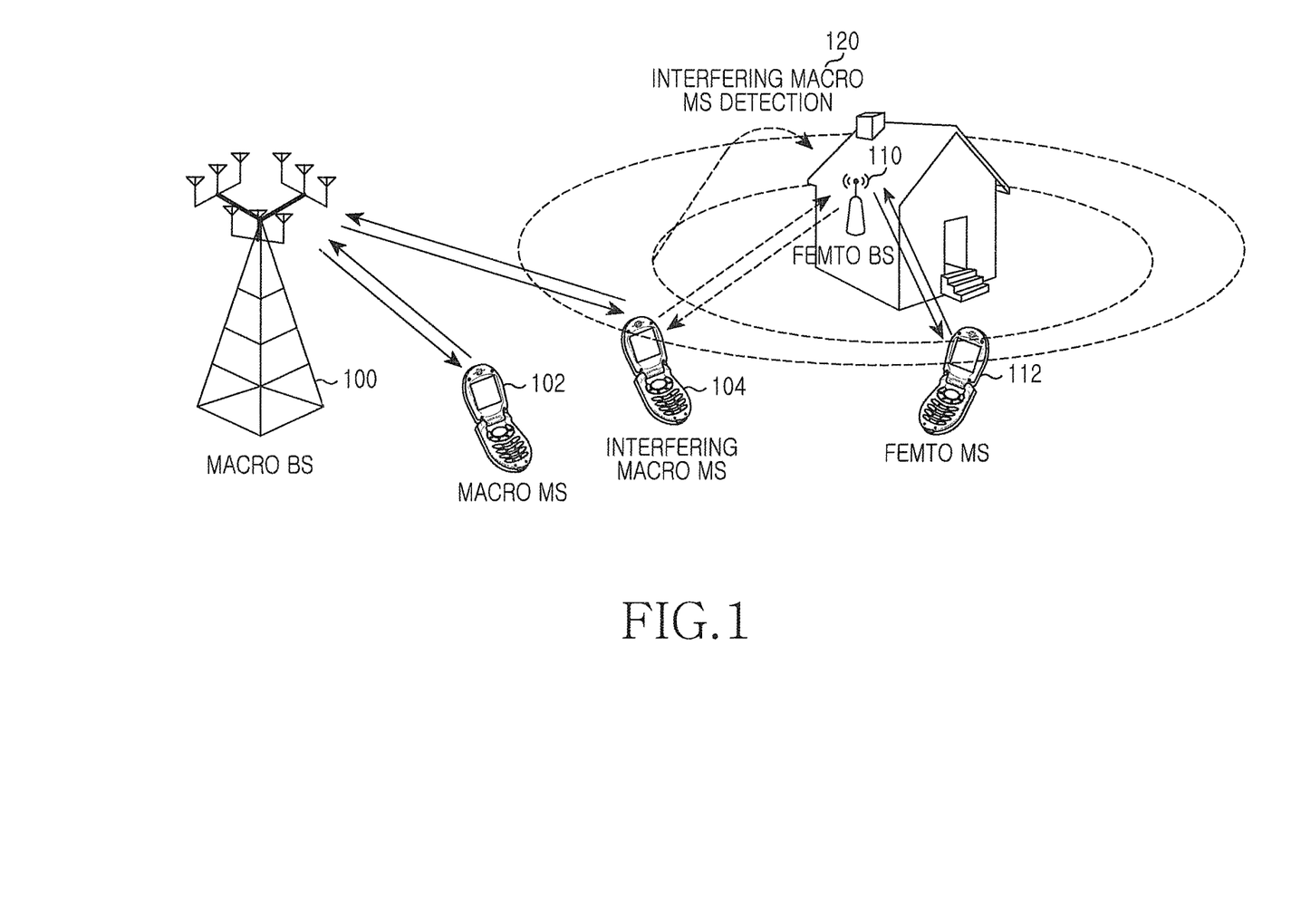
FIG. 1 illustrates an interference scenario in a heterogeneous network according to the present disclosure.

FIG. 1 is a diagram illustrating an interference scenario in a heterogeneous network according to the present disclosure.

Referring to FIG. 1, it is assumed that, in a heterogeneous network where a cell serviced by a femto BS 110 (hereinafter referred to as 'femto cell') overlaps in a cell serviced by a macro BS 100 (hereinafter referred to as 'macro cell'), macro MSs 102 and 104 receive a service through the macro BS 100 and a femto MS 112 receives a service through the femto BS 110. For the convenience of description, FIG. 1 illustrates one femto BS 110, two macro MSs 102 and 104, and one femto MS 112. However, it will be obvious that a plurality of femto BSs may be present in the heterogeneous network, a plurality of femto MSs may receive service through the relevant femto BS, and a plurality of macro MSs may receive service through the macro BS 100.

The macro MS 104 receives service through the macro BS 100. However, because the femto BS 110 is present around the macro MS 104, the macro MS 104 between the macro cell and the femto cell may cause an interference to the femto cell or may receive an interference from the femto cell. Thus, the femto BS 110 may determine to detect the adjacent macro MS 104 (120).

An Inter-Cell Interference Coordination (ICIC) scheme is used to mitigate the interference between a macro cell and a femto cell.

In the ICIC scheme, a UE detects an E-UTRAN Cell Global Identifier (ECGI) and the signal strengths of peripheral eNBs and HeNBs by Reference Signal Received Power (RSRP) measurement, and reports the detection to a connected eNB or HeNB. The ECGI is an identifier (ID) for identifying a cell, which includes a Mobile Country Code (MCC), a Mobile Network Code (MNC), and an E-UTRAN Cell Identifier (ECI).

An eNB, to which the UE is connected, transmits a Downlink High Interference Indicator (DL-HII) message to an interfering HeNB. The DL_HII message includes an ECGI of the interfering HeNB and the eNB and a field indicating Physical Resource Blocks (PRBs) with a high interference level.

Upon receiving the DL-HII message, the HeNB controls the use of resources indicated by the DL-HII message. A new DL-HII message received from the same eNB precedes an old DL-HII message.

In order to achieve a gain at the low interference power state of the PRBs, the eNB preferentially schedules the UE through the PRBs indicated by the DL-HII message.

Another ICIC scheme includes beamforming and power control in which necessary information is exchanged through an X2 interface.

Figure 2:
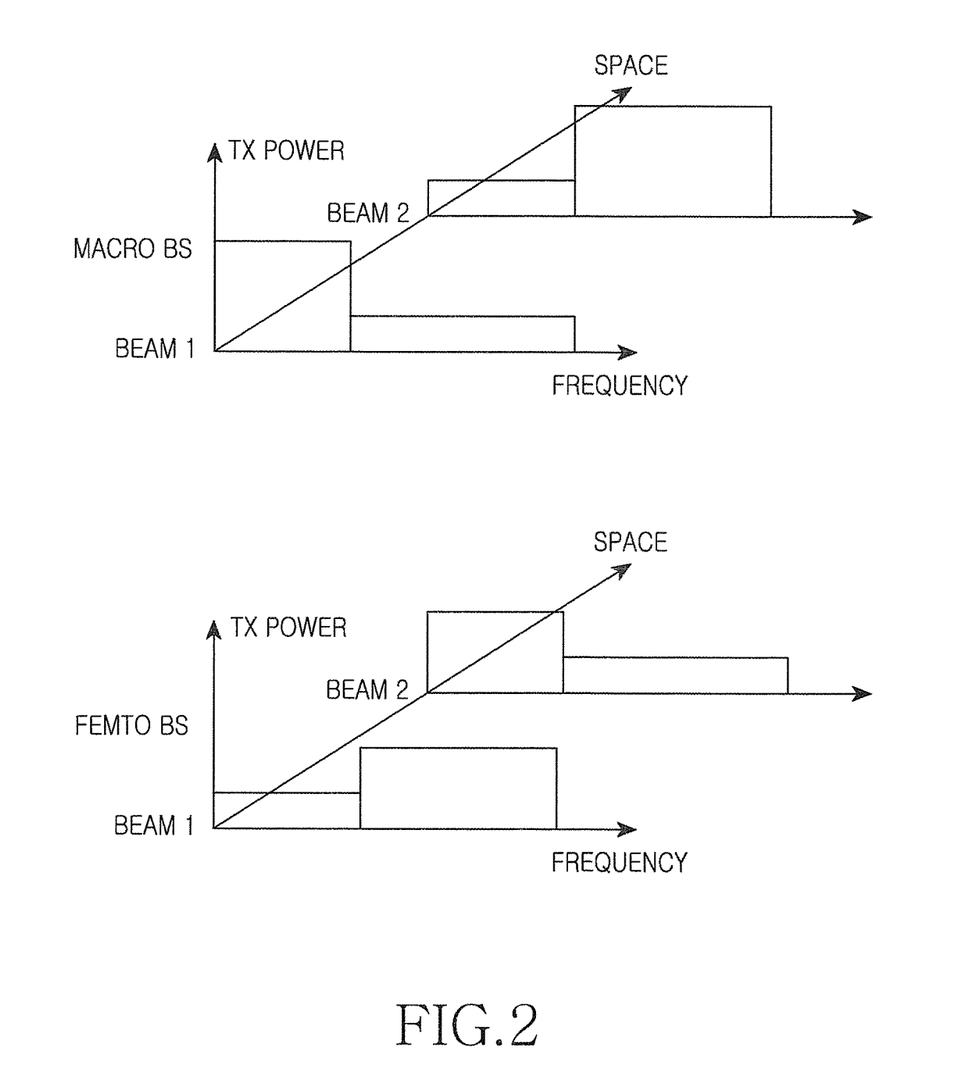
FIG. 2 illustrates coordinated beamforming according to the present disclosure.

FIG. 2 is a diagram illustrating coordinated beamforming according to the present disclosure.

Referring to FIG. 2, a MeNB and a HeNB use the direction of beams and time-frequency resource allocation coordination to apply beamforming to serving UEs.

For example, if the transmission (Tx) power of any one of a macro BS and a femto BS is set to a high level, the Tx power of the other BS is set to a low level. Also, when beams are formed in a femto BS or in a macro BS, if the Tx power of the first beam is set to a high level, the Tx power of the second beam is set to a low level.

Hereinafter, a description will be given of a scheme for mitigating a downlink (DL) interference in a heterogeneous network by combining a beamforming scheme and a resource allocation scheme.

Figure 3:
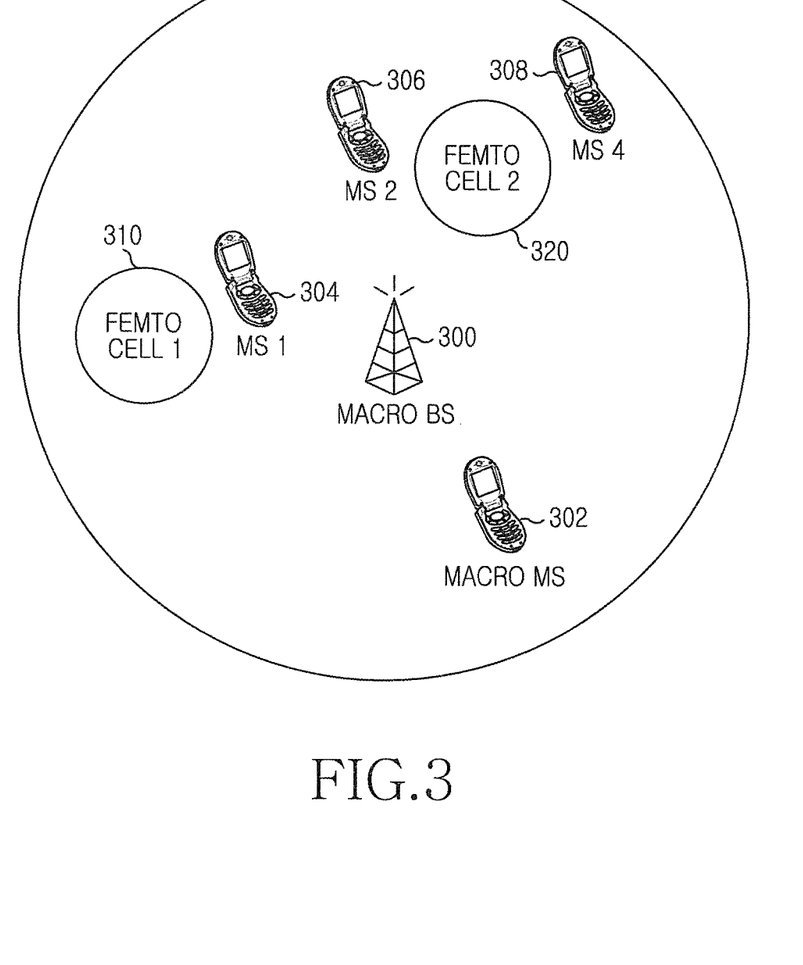
FIG. 3 illustrates a heterogeneous network according to an embodiment of the present disclosure.

FIG. 3 is a diagram illustrating a heterogeneous network according to an embodiment of the present disclosure.

Referring to FIG. 3, a plurality of femto cells 310 and 320 are present in a cell of a macro BS 300 (hereinafter referred to as 'macro cell'), and a macro MS 302 receives a service through the macro BS 300. Femto MSs 304 and 306 receive a service through the macro BS 300 or through femto BSs (not illustrated) in the relevant femto cells 310 and 320.

The femto BSs operating in the macro cell use frequency resources F1, F2, . . . , Fn (Fi=F−fo, where 'F' denotes the total frequency band, and 'fo' denotes the frequency resource that is orthogonal to 'Fi' and is allocated only to the macro MSs of the macro BS) to provide a service to the femto MSs. The macro BS 300 uses the entire frequency band F to provide a service to the macro MSs. The MS selects a serving BS (the macro BS 300 or the femto BS) on the basis of downlink channel measurements. For example, if the strength of a signal from the macro BS is greater than the strength of a signal from the femto BS, the MS selects the macro BS as a serving BS. Alternatively, if the strength of a signal from the macro BS is smaller than the strength of a signal from the femto BS, the MS selects the femto BS as a serving BS.

Figure 4:
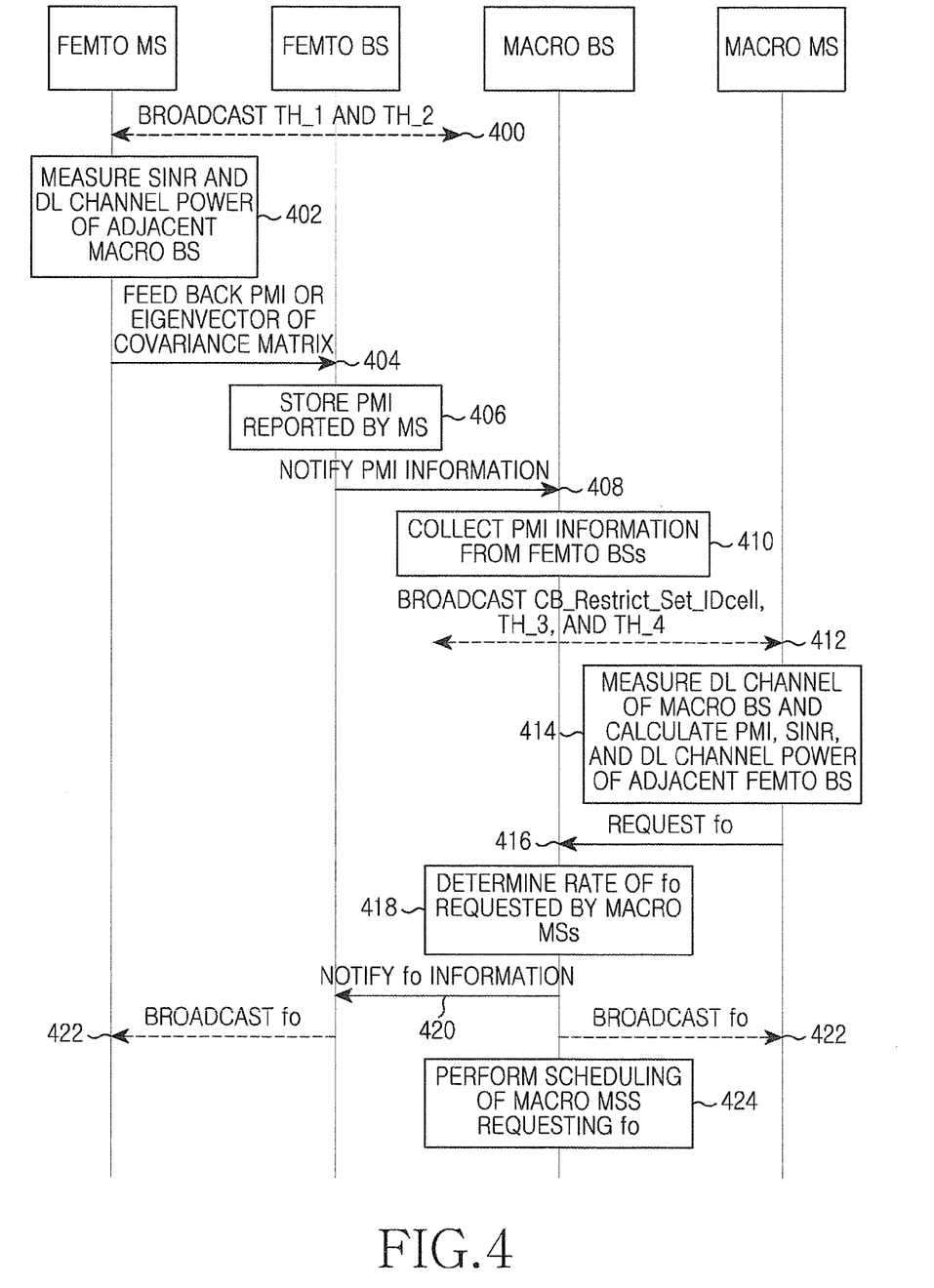
FIG. 4 illustrates a process for interference mitigation in a heterogeneous network using beamforming according to an embodiment of the present disclosure.

FIG. 4 is a flow diagram illustrating a process for interference mitigation in a heterogeneous network using beamforming according to an embodiment of the present disclosure.

Referring to FIG. 4, in block 400, a femto BS broadcasts a threshold value TH_1 for a signal-to-noise ratio and a threshold value TH_2 for the Rx power from a macro BS (RxPw_MeNB). The signal-to-noise ratio may be a Signal-to-Noise Ratio (SNR), a Signal-to-Interference plus Noise Ratio (SINR), a Carrier-to-Noise Ratio (CNR), or a Carrier-to-Interference plus Noise Ratio (CINR).

In another embodiment, the threshold value TH_1 and the threshold value TH_2 may be determined by system parameters.

In block 402, each femto MS serviced by the femto BS measures a signal-to-noise ratio (e.g., SINR) and the downlink channel power or the signal strength from the adjacent macro BS. If SINR<TH_1 and RxPw_MeNB>TH_2, the femto MS feeds back a principal eigenvector of a Tx covariance matrix E (H'*H), measured on the basis of the downlink channel from the macro BS, to the femto BS in block 404. Herein, 'H' denotes an m*n channel matrix, 'm' denotes the number of Rx antennas, 'n' denotes the number of Tx antennas, and 'E' denotes an average. That is, a principal eigenvector V of a Tx covariance matrix E (H'*H) is found, and a Precoding Matrix Index (PMI) Wk with the principal eigenvector V of the highest correlation is found. The eigenvector is represented by a PMI in a CL/OL MIMO codebook.

The femto BS collects PMIs reported by the femto MSs in block 406, and the femto BS requests the relevant PMI from the macro BS in block 408.

In block 410, the macro BS collects PMIs requested by other femto BSs including the femto BS and configures a PMI set (hereinafter referred to as 'CB_Restrict_Set_IDcell'). That is, the CB_Restrict_Set_IDcell includes PMI information requested by the femto BS corresponding to an identifier (IDcell) of the relevant femto cell. According to an embodiment, the macro BS may use a precoder with a larger beamwidth to represent the CB_Restrict_Set_IDcell. The beamwidth is an angular representation of the directionality of an antenna.

In block 412, the macro BS broadcasts the CB_Restrict_Set_IDcell, a threshold value TH_3 for a signal-to-noise ratio, and a threshold value TH_4 for the Rx power from a femto BS (RxPw_HeNB).

In another embodiment, the threshold value TH_3 and the threshold value TH_4 may be determined by system parameters.

In block 414, a macro MS serviced by the macro BS measures a downlink channel from the macro BS, and calculates a PMI maximizing the downlink channel power (PMI_max), an SINR, and the downlink channel power from the adjacent femto BS (RxPw_HeNB).

If the PMI_max is within the CB_Restrict_Set_IDcell, the macro MS transmits a message, which is used to request the frequency resource (fo) orthogonal to the frequency used by the femto BS, to the macro BS in block 416.

Also, if SINR<TH_3 and RxPw_HeNB>TH_4, the macro MS transmits a message, which is used to request the frequency resource (fo) orthogonal to the frequency used by the femto BS, to the macro BS.

Alternatively, if the PMI_max is not within the CB_Restrict_Set_IDcell, or if SINR<TH_3 and RxPw_HeNB>TH_4 are not satisfied, the macro MS does not transmit a message, which is used to request the frequency resource (fo) orthogonal to the frequency used by the femto BS, to the macro BS. Herein, the macro MS receives a service based on the entire frequency band.

In block 418, the macro BS determines the proportion of fo to the entire frequency band based on user differentiation in PMI on the basis of the fo request message from the macro MSs. Herein, the technique of determining the proportion of fo to the total frequency band based on user differentiation is merely an exemplary embodiment, and the ratio of fo to the entire frequency band may be determined in various ways.

The macro BS notifies the fo information to the femto BS in block 420, or the macro BS or the femto BS broadcasts the fo information through a control message in block 422.

In block 424, in response to the fo request of the macro MS, the macro BS determines whether to schedule the macro MS in the fo. The macro MS allocated the fo measures a downlink channel and feeds back information necessary for CL/OL MIMO operation (not illustrated).

Figure 5:
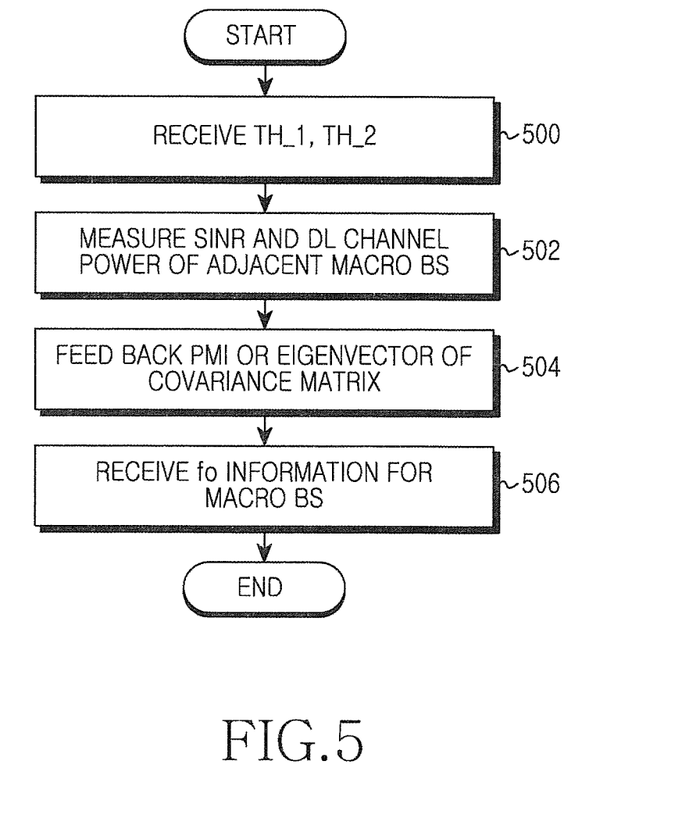
FIG. 5 illustrates a process of operating a femto MS for interference mitigation in a heterogeneous network using beamforming according to an embodiment of the present disclosure.

FIG. 5 is a flow diagram illustrating a process of operating a femto MS for interference mitigation in a heterogeneous network using beamforming according to an embodiment of the present disclosure.

Referring to FIG. 5, in block 500, a femto MS receives a threshold value TH_1 for a signal-to-noise ratio and a threshold value TH_2 for the Rx power from a macro BS (RxPw_MeNB) from a femto BS. The signal-to-noise ratio may be an SNR, an SINR, a CNR, or a CINR.

In block 502, the femto MS measures a signal-to-noise ratio (e.g., SINR) and the downlink channel power or the signal strength from the adjacent macro BS.

In block 504, the femto MS feeds back a principal eigenvector of a Tx covariance matrix E(H'*H), measured on the basis of the downlink channel from the macro BS, to the femto BS. The eigenvector is represented by a PMI in a CL/OL MIMO codebook.

In block 506, the femto MS receives fo information for the macro BS.

Thereafter, the femto MS ends the process of the present disclosure.

Figure 6:
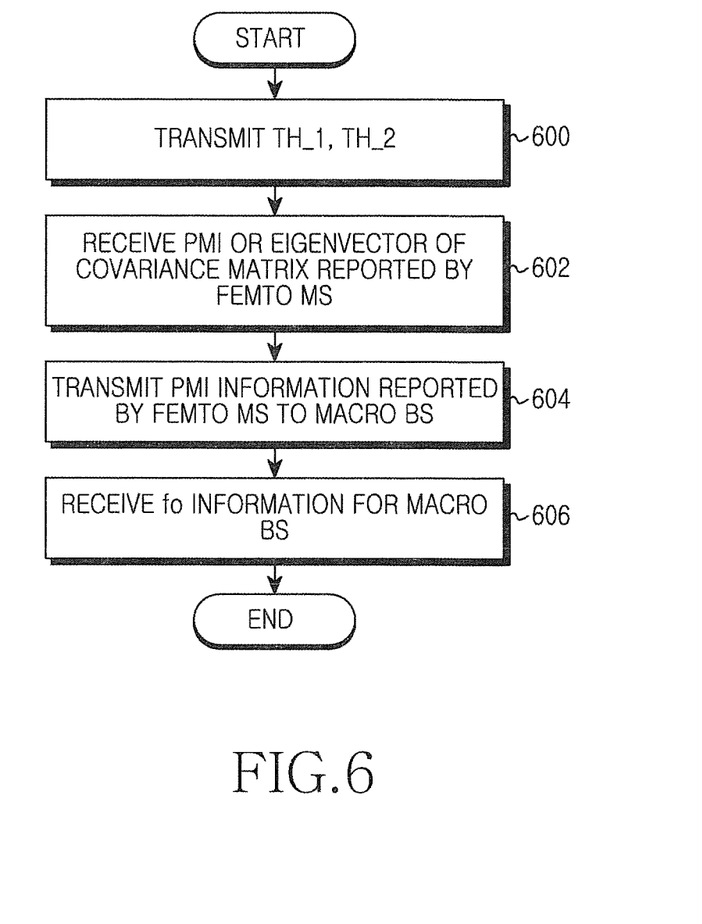
FIG. 6 illustrates a process of operating a femto BS for interference mitigation in a heterogeneous network using beamforming according to an embodiment of the present disclosure.

FIG. 6 is a flow diagram illustrating a process of operating a femto BS for interference mitigation in a heterogeneous network using beamforming according to an embodiment of the present disclosure.

Referring to FIG. 6, in block 600, a femto BS broadcasts a threshold value TH_1 for a signal-to-noise ratio and a threshold value TH_2 for the Rx power from a macro BS (RxPw_MeNB).

In block 602, the femto BS receives a principal eigenvector of a Tx covariance matrix, measured by femto MSs, from the femto MSs and stores the same.

In block 604, the femto BS requests PMIs, reported by the femto MSs, from the macro BS.

In block 606, the femto BS receives fo information for the macro BS.

Thereafter, the femto BS ends the process of the present disclosure.

Figure 7:
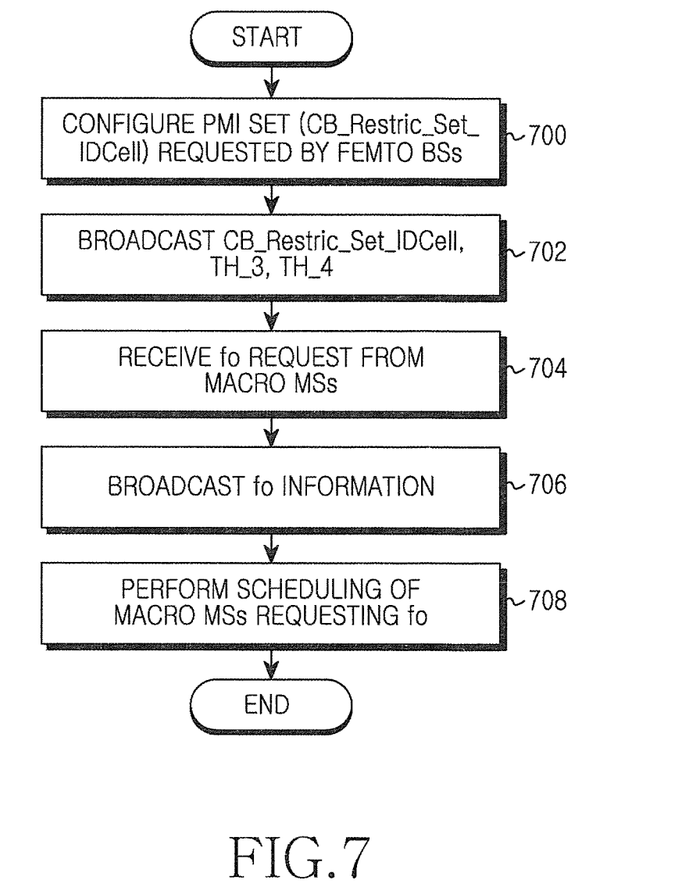
FIG. 7 illustrates a process of operating a macro BS for interference mitigation in a heterogeneous network using beamforming according to an embodiment of the present disclosure.

FIG. 7 is a flow diagram illustrating a process of operating a macro BS for interference mitigation in a heterogeneous network using beamforming according to an embodiment of the present disclosure.

Referring to FIG. 7, in block 700, a macro BS collects PMIs requested by other femto BSs including the femto BS and constructs a PMI set (hereinafter referred to as 'CB_Restrict_Set_IDcell'). That is, the CB_Restrict_Set_IDcell includes PMI information requested by the femto BS corresponding to an identifier (IDcell) of the relevant femto cell. According to an embodiment, the macro BS may use a precoder with a larger beamwidth to represent the CB_Restrict_Set_IDcell. The beamwidth is an angular representation of the directionality of an antenna.

In block 702, the macro BS broadcasts the CB_Restrict_Set_IDcell, a threshold value TH_3 for a signal-to-noise ratio, and a threshold value TH_4 for the Rx power from the femto BS (RxPw_HeNB).

In block 704, the macro BS receives a fo request from the macro MSs. In block 706, the macro BS broadcasts fo information.

In block 708, in response to the fo request of the macro MS, the macro BS determines whether to schedule the macro MS in the fo. The macro MS allocated the fo measures a downlink channel and feeds back information necessary for CL/OL MIMO operation (not illustrated).

Figure 8:
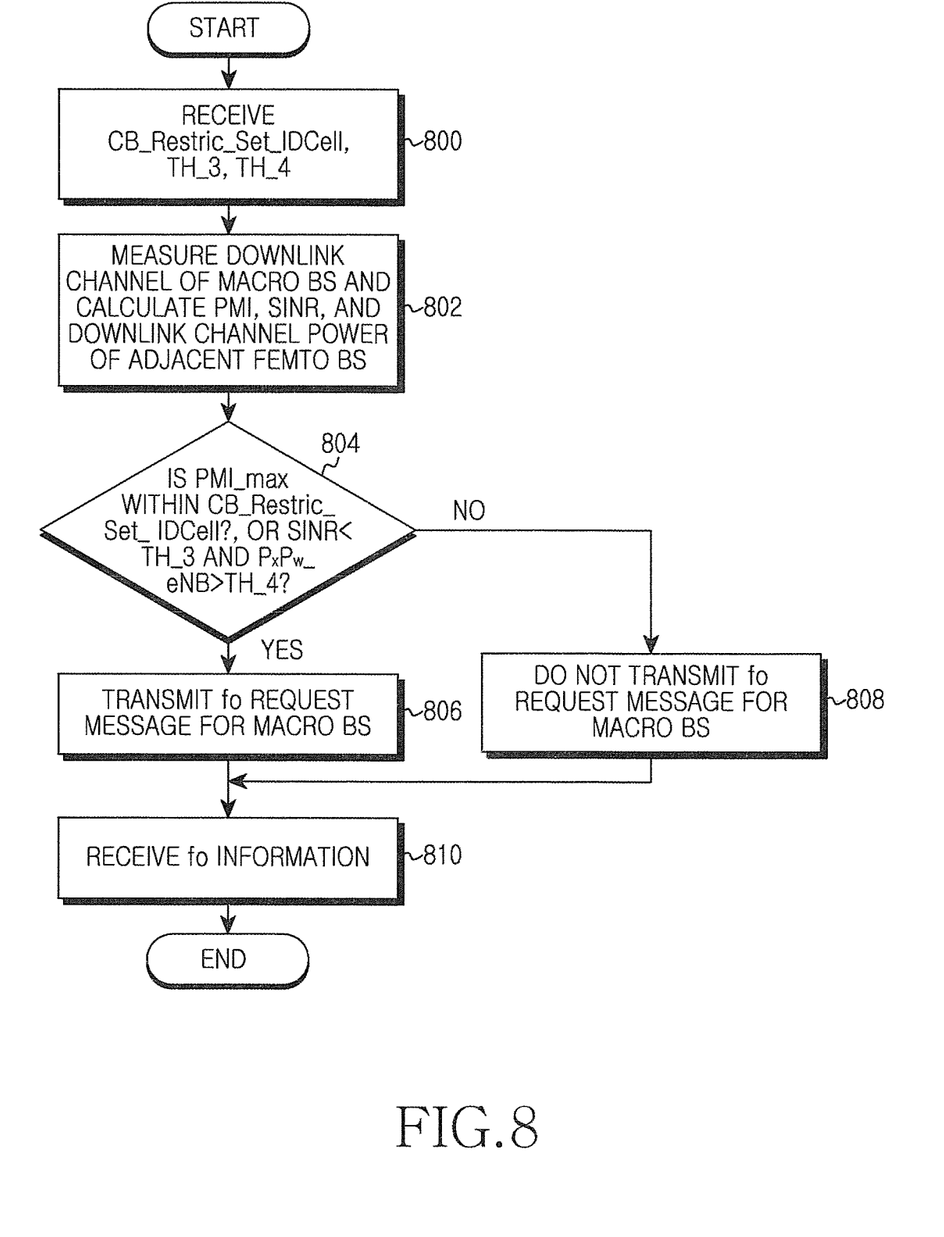
FIG. 8 illustrates a process of operating a macro MS for interference mitigation in a heterogeneous network using beamforming according to an embodiment of the present disclosure.

FIG. 8 is a flow diagram illustrating a process of operating a macro MS for interference mitigation in a heterogeneous network using beamforming according to an embodiment of the present disclosure.

Referring to FIG. 8, in block 800, a macro MS receives a CB_Restrict_Set_IDcell, a threshold value TH_3 for a signal-to-noise ratio, and a threshold value TH_4 for the Rx power from a femto BS (RxPw_HeNB).

In block 802, the macro MS measures a downlink channel from the macro BS, and calculates a PMI maximizing the downlink channel power (PMI_max) (i.e., the PMI Wk with a norm H*Wk), an SINR, and the downlink channel power from the adjacent femto BS (RxPw_HeNB).

If the PMI_max is within the CB_Restrict_Set_IDcell in block 804, the macro MS transmits a message, which is used to request the frequency resource (fo) orthogonal to the frequency used by the femto BS, to the macro BS in block 806.

Also, if SINR<TH_3 and RxPw_HeNB>TH_4, the macro MS transmits a message, which is used to request the frequency resource (fo) orthogonal to the frequency used by the femto BS, to the macro BS in block 806.

Alternatively, if the PMI_max is not within the CB_Restrict_Set_IDcell, or if SINR<TH_3 and RxPw_HeNB>TH_4 are not satisfied, the macro MS does not transmit a message, which is used to request the frequency resource (fo) orthogonal to the frequency used by the femto BS, to the macro BS in block 808. Herein, the macro MS receives a service based on the entire frequency band.

In block 810, the macro MS receives fo information.

Figure 9:
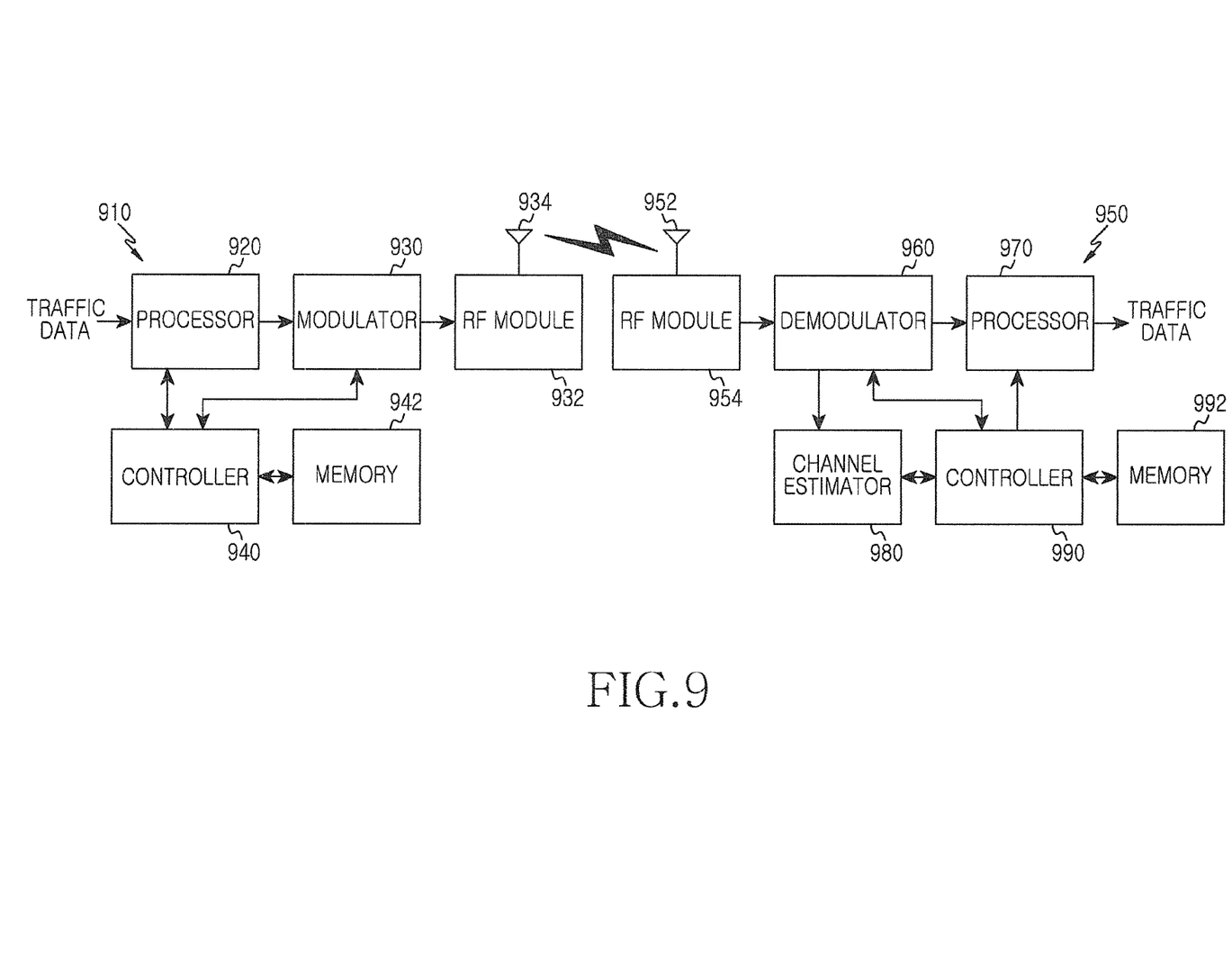
FIG. 9 illustrates a transmitter/receiver according to an embodiment of the present disclosure.

FIG. 9 is a block diagram of a transmitter and receiver according to an embodiment of the present disclosure.

In a downlink, a transmitter is a portion of a macro BS (or a femto BS) and a receiver is a portion of a macro MS (or a femto MS). In a downlink, a transmitter is a portion of a macro MS (or a femto MS) and a receiver is a portion of a macro BS (or a femto BS).

Referring to FIG. 9, in the transmitter 910, a processor 920 generates data symbols by encoding, interleaving and symbol-mapping data (e.g., traffic data and signaling). Also, the processor 920 generates pilot symbols and multiplexes data symbols and pilot symbols. A modulator 930 generates a suitable transmission symbol according to a radio access method. A Radio Frequency (RF) module 932 processes (e.g., analog conversion, amplification, and filtering, and frequency up-conversion) the transmission symbol and generates an RF signal transmitted through a Tx antenna 934.

In the receiver 950, an antenna 952 receives a signal from the transmitter and provides the same to an RF module 954. The RF module 954 processes (e.g., filtering, amplification, frequency down-conversion, digitalization) the received signal and provides input samples. A demodulator 960 demodulates the input samples and provides a data value and a pilot value. A channel estimator 980 derives a channel estimation value on the basis of the received pilot values. The demodulator 960 performs data detection (or equalization) for the received data value by the channel estimation value, and provides a data symbol estimation value for a transmitter. A processor 970 symbol-demaps, deinterleaves and decodes the data symbol estimation values and provides decoded data. In general, the processing by the demodulator 960 and the processor 970 in the receiver is reciprocal to the processing by the modulator 930 and the processor 920 in the transmitter.

Controllers 940, 990 control the operations of various processing modules in the transmitter 910 and receiver 950. In order to perform the operations related to the embodiments described with reference to the accompanying drawing, the controllers 940, 990 perform a digital signal processing operation and control the operations of various processing modules. Memories 942, 992 stores program codes and data for the transmitter 910 and receiver 950.

The embodiments described above may be combinations of elements and features of the present disclosure. The elements or features may be considered selective unless otherwise mentioned. Each element or feature may be practiced without being combined with other elements or features. Also, parts of the elements and/or features may be combined to construct an exemplary embodiment of the present disclosure. Operation orders described in the exemplary embodiments of the present disclosure may be rearranged. Some constructions or features of an exemplary embodiment may be included in another exemplary embodiment or may be replaced with corresponding constructions of another exemplary embodiment. It will be obvious that claims that are not explicitly cited in each other in the appended claims may be presented in combination as an exemplary embodiment or included as a new claim by a subsequent amendment after the application is filed.

The exemplary embodiments of the present disclosure may be achieved by various means, for example, hardware, firmware, software, or a combination thereof. In a hardware configuration, the exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the exemplary embodiments of the present disclosure may be implemented in the form of a module, a procedure, or a function performing functions or operations as described above. A software code may be stored in a memory unit and executed by a processor. The memory unit may be located inside or outside the processor and may communicate data with the processor through various known means.

As described above, the present disclosure provides interference mitigation in a heterogeneous network using beamforming, thereby making it possible to improve the system performance.

While the invention has been shown and described with reference to certain exemplary embodiments thereof, it will be understood by those skilled in the art that various changes in form and details may be made therein without departing from the spirit and scope of the disclosure as defined by the appended claims. Therefore, the scope of the invention is defined not by the detailed description of the invention but by the appended claims, and all differences within the scope will be construed as being included in the present invention.

What is claimed is:

1. A method for operating a femto Mobile Station (MS) for interference mitigation in a heterogeneous network using beamforming, the method comprising:

receiving a broadcast message from a femto Base Station (BS), the broadcast message comprising at least one of a first threshold value for a Signal-to-Interference plus Noise Ratio (SINR) and a second threshold value for a reception signal strength from an adjacent macro BS;

measuring the SINR and a channel power from the adjacent macro BS; and upon a determination that the SINR is smaller than the first threshold value and the channel power from the adjacent macro BS is greater than the second threshold value, feeding back a restricted Precoding Matrix Index (PMI) or a preferred PMI to the femto BS based on the measured SINR and the channel power from the adjacent macro BS.

2. The method of claim 1, wherein the PMI is determined by an eigenvector of a measured covariance matrix.

3. The method of claim 1, further comprising:

determining whether the measured SINR is smaller than the first threshold value and the channel power from the adjacent macro BS is greater than the second threshold value.

4. The method of claim 1, wherein the heterogeneous network includes a plurality of macro cells, and one or more femto BSs overlap in one macro cell.

5. The method of claim 1, further comprising receiving information about dedicated frequency resources for macro MSs in the adjacent macro BS from the femto BS.

6. A method for operating a femto Base Station (BS) for interference mitigation in a heterogeneous network using beamforming, the method comprising:

transmitting a broadcast message, the broadcast message comprising at least one of a first threshold value for a Signal-to-Interference plus Noise Ratio (SINR) and a second threshold value for a reception signal strength from an adjacent macro BS;

receiving a restricted Precoding Matrix Index (PMI) or a preferred PMI from each of a plurality of femto Mobile Stations (MSs), when a SINR measured by the each femto MS is smaller than the first threshold value and a channel power from the adjacent macro BS measured by the each femto MS is greater than the second threshold value; and providing the PMI information to the adjacent macro BS on the basis of the PMI information received from the femto MSs.

7. The method of claim 6, wherein the PMI is determined by an eigenvector of a measured covariance matrix.

8. The method of claim 6, wherein the restricted PMI or the preferred PMI is fed back from the each femto MS when the SINR measured by the each femto MS is smaller than the first threshold value and the channel power from the adjacent macro BS is greater than the second threshold value.

9. The method of claim 6, wherein the heterogeneous network includes a plurality of macro cells, and one or more femto BSs overlap in one macro cell.

10. The method of claim 6, further comprising:

receiving information about dedicated frequency resources for macro MSs from the adjacent macro BS; and transmitting the information about the dedicated frequency resources for the macro MSs to the femto MS.

11. An apparatus of a femto Mobile Station (MS) for interference mitigation in a heterogeneous network using beamforming, the apparatus comprising:

a Radio Frequency (RF) module configured to receive a broadcast message from a femto Base Station (BS), the broadcast message comprising at least one of a first threshold value for a Signal-to-Interference plus Noise Ratio (SINR) and a second threshold value for a reception signal strength from an adjacent macro BS;
a processor configured to measure the SINR and a channel power from the adjacent macro BS; and
a controller configured to, upon a determination that the SINR is smaller than the first threshold value and the channel power from the adjacent macro BS is greater than the second threshold value, feed back a restricted Precoding Matrix Index (PMI) or a preferred PMI to the femto BS on the basis of the measured SINR and the channel power from the adjacent macro BS.

12. The apparatus of claim 11, wherein the PMI is determined by an eigenvector of a measured covariance matrix.

13. The apparatus of claim 11, wherein the controller is further configured to:
determine whether the measured SINR is smaller than the first threshold value and the channel power from the adjacent macro BS is greater than the second threshold value.

14. The apparatus of claim 11, wherein the heterogeneous network includes a plurality of macro cells, and one or more femto BSs overlap in one macro cell.

15. The apparatus of claim 11, wherein the RF module receives information about dedicated frequency resources for macro MSs in the adjacent macro BS from the femto BS.

16. An apparatus of a femto Base Station (BS) for interference mitigation in a heterogeneous network using beamforming, the apparatus comprising:
a Radio Frequency (RF) module configured to transmit a broadcast message, and receive a restricted Precoding Matrix Index (PMI) or a preferred PMI from each of a plurality of femto Mobile Stations (MSs) when a Signal-to-Interference plus Noise Ratio (SINR) measured by the each femto MS is smaller than a first threshold value and a channel power from an adjacent macro BS measured by the each femto MS is greater than a second threshold value, wherein the broadcast message includes at least one of the first threshold value for the SINR and the second threshold value for a reception signal strength from the adjacent macro BS; and
a controller configured to provide the PMI information to the adjacent macro BS based on the PMI information received from the femto MSs.

17. The apparatus of claim 16, wherein the PMI is determined by an eigenvector of a measured covariance matrix.

18. The apparatus of claim 16, wherein the restricted PMI or the preferred PMI is fed back from the each femto MS when the SINR measured by the each femto MS is smaller than the first threshold value and the channel power from the adjacent macro BS is greater than the second threshold value.

19. The apparatus of claim 16, wherein the heterogeneous network includes a plurality of macro cells, and one or more femto BSs overlap in one macro cell.

20. The apparatus of claim 16, wherein the RF module is configured to:
receive information about dedicated frequency resources for macro MSs from the adjacent macro BS; and
transmit the information about the dedicated frequency resources for the macro MSs to the femto MS.

* * * * *